United States Patent [19]
Jackson

[11] 3,987,975

[45] Oct. 26, 1976

[54] MAGNETIC TAPE REEL WITH STOP MEANS

[75] Inventor: Mark Jackson, New York, N.Y.

[73] Assignee: Lawrence Peska Associates, Inc., New York, N.Y.

[22] Filed: Apr. 10, 1975

[21] Appl. No.: 566,947

[52] U.S. Cl. .............................................. 242/71.8
[51] Int. Cl.² ......................................... B65H 75/18
[58] Field of Search ............... 242/71.8, 71.8 A, 74, 242/118.4

[56] References Cited
UNITED STATES PATENTS

| | | | |
|---|---|---|---|
| 1,009,673 | 11/1911 | Lang | 242/74 |
| 2,224,075 | 12/1940 | Cavanaugh | 242/118.4 |
| 2,642,639 | 6/1953 | Meighan | 242/71.8 X |
| 2,969,203 | 1/1961 | Mohrlant | 242/74 |
| 3,489,371 | 1/1970 | Smith | 242/74 X |

FOREIGN PATENTS OR APPLICATIONS

| | | | |
|---|---|---|---|
| 1,154,390 | 10/1957 | France | 242/71.8 A |

*Primary Examiner*—Edward J. McCarthy

[57] ABSTRACT

A reel particularly designed for carrying magnetic tape, such as that used in reel to reel tape recorders, has a hub having at the axial extremities thereof discs for retaining the tape on the hub. The discs are provided with a plurality of holes disposed at various radial distances from the axis of the reel. Each hole in one disc is disposed in aligned relationship with a corresponding hole in the second disc. The axes of the aligned holes in the two discs are disposed in generally parallel relationship to the axis of the reel. Pins are selectively positioned in the aligned holes to limit unwinding of the tape carried on the reel.

1 Claim, 2 Drawing Figures

MAGNETIC TAPE REEL WITH STOP MEANS

BACKGROUND OF THE INVENTION

The invention relates to reels for holding a tape and particularly to reels particularly adapted to handle magnetic tape such as that used in various sound systems as well as automatic data processing applications. The prior art includes a variety of reels such as that typically used in reel to reel and cassette recording apparatus. Frequently such apparatus has included a radially extending opening to permit a user to observe a quantity of tape remaining on the reel. In other constructions a transparent or transluscent side is provided for the reel to permit observation of the quantity of tape on the reel. Such apparatus while assisting in the visual observation of the quantity of tape remaining on the reel and a means to grasp the reel does not provide a means for controlling the amount of tape which passes therefrom in the normal operation of the reel.

It ia a primary object of the invention to provide apparatus which will permit the user thereof to control selectively various amounts of tape which may be unspooled from a given reel.

It is another object of the invention to provide such apparatus which is simple and inexpensive to manufacture.

SUMMARY OF THE INVENTION

It has now been found that these and other objects of the invention may be attained by a reel which has a hub and two axially spaced discs carried thereon. A bar carried by the discs is disposed at a radius from the hub normally in generally parallel relationship to the axis of the hub.

Normally the discs will have a pair of apertures disposed at each of a plurality of radii from the hub. One of the apertures in each pair is disposed in one disc and the other of the apertures is disposed in the other of the discs. Each pair of apertures is coaxial and has the axis thereof disposed in generally parallel relationship to the hub. Normally the bar will be round and each disc will have an opening therein which is bounded by two radially extending sides and an arcuate section having the center curvature thereof proximate to the axis of the hub.

BRIEF DESCRIPTION OF THE DRAWING

The invention will be better understood by reference to the accompanying drawing in which.

DESCRIPTION OF THE PREFERRED EMBODIMENT

Figure 1:
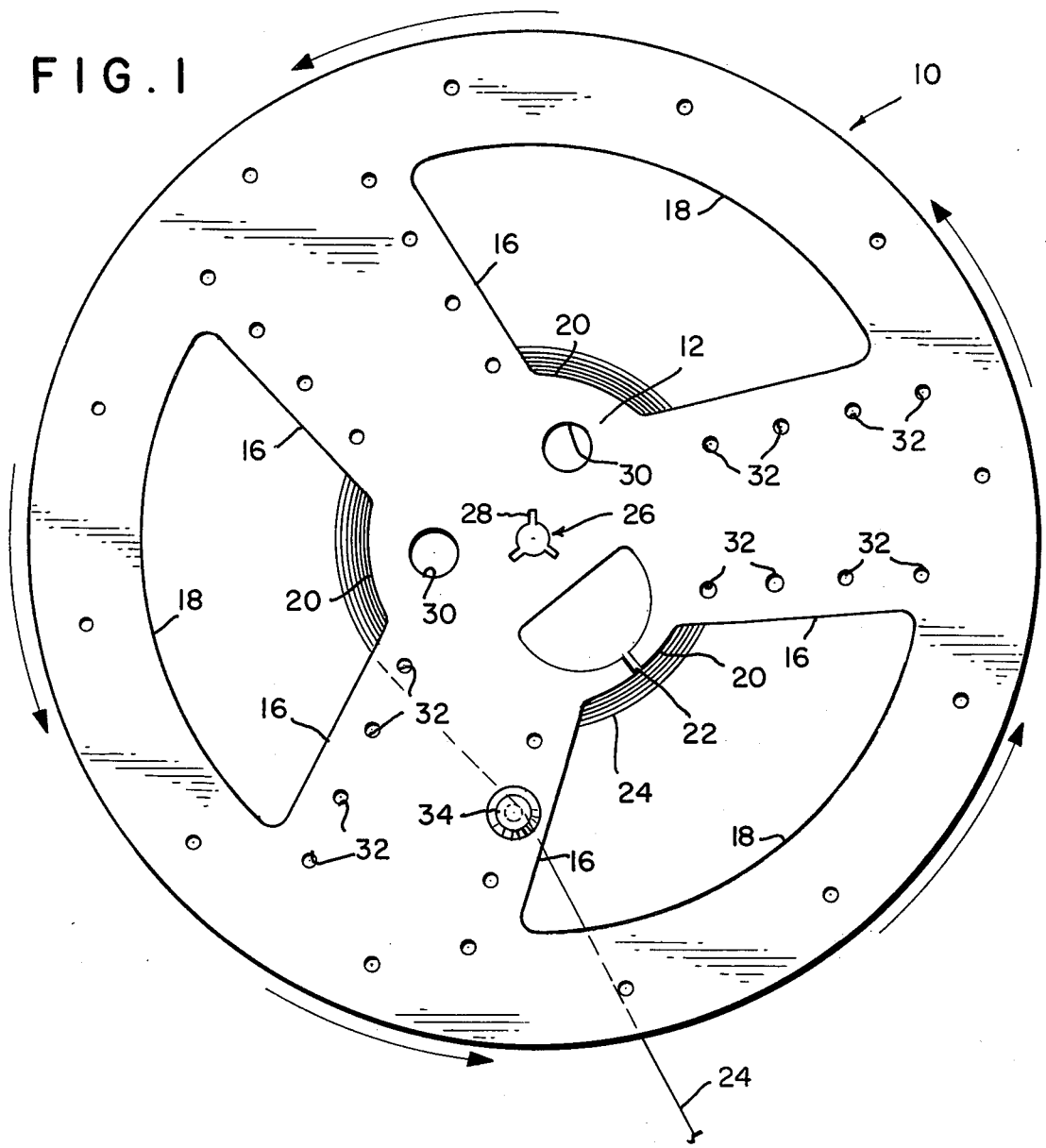
FIG. 1 is a top view of the novel apparatus in accordance with the invention.

Referring now to FIG. 1 there is shown a reel 10 having a hub 12 and two disc-shaped side members 14, 14. The side members 14, 14 are generally round and have the axis thereof disposed in coaxial relationship to the axis of the hub. In the conventional manner the side members 14, 14 may have openings therein defined by radially extending sides 16 and an arcuate side 18 as well an additional arcuate side 20. A slot 22 is provided for retaining the axial extremity of a piece of tape 24 within the reel. A splined hole 26 is provided for driving engagement with tape deck drive member 28. Holes 30, 30 are provided in the conventional manner.

Disposed at a plurality of radii from the axis of the hub 12 a plurality of apertures 32 the apertures are similarly located in each side member 14 so that pairs of apertures are formed which are disposed in coaxial relationship with the axis thereof in aligned relationship to the axis of the hub 12. A bar or pin 34 is provided having the circumference dimensioned and configured for snug fitting engagement with the pairs of apertures 32 whereby the axis of the pin 34 is disposed in generally parallel relationship to the axis of the hub 12.

Figure 2:
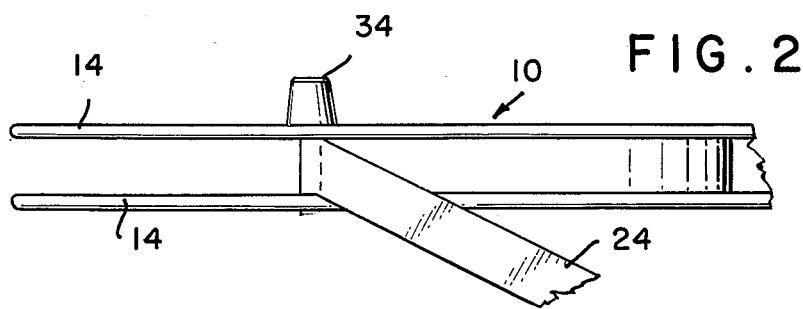
FIG. 2 is a side view of the apparatus shown in FIG. 1.

In operation the pin 34 is inserted in an appropriate radial position such that the amount of unwinding from the reel 10 is limited. By limiting the amount of unwinding sound will only be recorded on the first portion to be removed from the tape and the inner portion on the reel 10 will not be affected. It will be understood that the view in FIG. 2 shows the tape 24 displaced axially with respect to the hub of the reel 10 to better illustrate the operation of the pin 34 and that in normal operation no such displacement will occur.

Having thus described my invention, I claim:

1. An improved magnetic tape reel having a hub with a slot therein for receiving one end of a magnetic tape therein and two disc side members integrally joined to said hub, an axis of each said disc member disposed in coaxial relationship to an axis of said hub, each said side member having openings therein, said opening defined by radially extending sides and an arcuate section having the center curvative thereof proximate to said axis of said hub, one said disc member having a center splined hole therein, wherein the improvement comprises:
    a. each said disc having a plurality of apertures therethrough, each said aperture of one said disc member being aligned with one of said apertures of said other disc members, said apertures of each said disc member being disposed at a plurality of different radii from said axis of said hub, an axis of each said aperture being coaxially aligned with said axis of said hub;
    b. a pin member, said pin member disposed in one of said plurality of a pair of said aligned apertures of said two disc members, said pin extending between said two disc members, said tape unwinding as said reel revolves until said tape engages said pin between said two disc members, an amount of said unwinding of said tape being dependent upon location of said pin in one of said pairs of said aligned apertures.

* * * * *